US012435543B2

(12) United States Patent
Hawkins et al.

(10) Patent No.: US 12,435,543 B2
(45) Date of Patent: Oct. 7, 2025

(54) LOCK UNIT

(71) Applicant: AUTOMATIC TECHNOLOGY (AUSTRALIA) PTY LTD, Keysborough (AU)

(72) Inventors: Raymond Hawkins, Keysborough (AU); Kane Clinton, Keysborough (AU)

(73) Assignee: AUTOMATIC TECHNOLOGY (AUSTRALIA) PTY LTD, Keysborough (AU)

(*) Notice: Subject to any disclaimer, the term of this patent is extended or adjusted under 35 U.S.C. 154(b) by 432 days.

(21) Appl. No.: 17/273,615

(22) PCT Filed: Sep. 6, 2019

(86) PCT No.: PCT/AU2019/050964

§ 371 (c)(1),
(2) Date: Mar. 4, 2021

(87) PCT Pub. No.: WO2020/047614

PCT Pub. Date: Mar. 12, 2020

(65) Prior Publication Data

US 2021/0363784 A1 Nov. 25, 2021

(30) Foreign Application Priority Data

Sep. 7, 2018 (AU) ................................ 2018903350

(51) Int. Cl.
*E05B 47/00* (2006.01)
*E05B 35/00* (2006.01)
(Continued)

(52) U.S. Cl.
CPC ........ *E05B 47/0012* (2013.01); *E05B 35/008* (2013.01); *E05B 47/026* (2013.01);
(Continued)

(58) Field of Classification Search
CPC ............... E05B 47/0012; E05B 47/026; E05B 2047/0016; E05B 2047/002;
(Continued)

(56) References Cited

U.S. PATENT DOCUMENTS 7,240,524 B1 * 7/2007 White ................. E05B 65/0021 70/279.1
7,731,250 B2 * 6/2010 Garneau ............. E05B 63/0065 292/144
(Continued)

FOREIGN PATENT DOCUMENTS

AU 2003222679 B9 11/2003
AU 2015238864 A1 * 4/2016
(Continued)

OTHER PUBLICATIONS

Machine translation of ES-2628040-A1 (Year: 2017).*
(Continued)

*Primary Examiner* — Christine M Mills
*Assistant Examiner* — Peter H Watson

(57) ABSTRACT

The invention concerns a lock unit, comprising a lock assembly having a locking element and a drive receiving portion operatively associated with the locking element and a drive unit connected to the lock assembly, the drive unit having a motor and being configured to move the locking element of the lock assembly from a locked position to an unlocked position, the drive unit including a driving element that interfaces with the drive receiving portion of the lock assembly to move the locking element from the locked position to the unlocked position, wherein the drive unit is selectively separable from the lock assembly. The invention facilitates fitment of the lock assembly in position, provides a more compact and secure solution, and assists in regard to maintenance.

13 Claims, 9 Drawing Sheets

(51) Int. Cl.

| | |
|---|---|
| ***E05B 47/02*** | (2006.01) |
| ***E05B 63/04*** | (2006.01) |
| ***E05B 65/00*** | (2006.01) |
| *E05B 41/00* | (2006.01) |

(52) U.S. Cl.

CPC ........ *E05B 63/042* (2013.01); *E05B 65/0021* (2013.01); *E05B 41/00* (2013.01); *E05B 2047/0016* (2013.01); *E05B 2047/002* (2013.01); *E05B 2047/0024* (2013.01); *E05B 2047/0036* (2013.01); *E05B 2047/0058* (2013.01); *E05B 2047/0084* (2013.01); *E05B 2047/0091* (2013.01)

(58) Field of Classification Search

CPC ..... E05B 2047/0036; E05B 2047/0084; E05B 2047/0091; E05B 63/042; E05B 35/008; E05B 65/0021

See application file for complete search history.

(56) References Cited

U.S. PATENT DOCUMENTS

| | | | | |
|---|---|---|---|---|
| 2003/0209043 | A1 | 11/2003 | Yeh et al. | |
| 2006/0267349 | A1 * | 11/2006 | Garneau | E05B 47/0012 292/144 |
| 2008/0296912 | A1 | 12/2008 | Whitner et al. | |
| 2016/0208518 | A1 * | 7/2016 | Roatis | G07C 9/30 |
| 2016/0258189 | A1 | 9/2016 | Frolov | |

FOREIGN PATENT DOCUMENTS

| | | | | |
|---|---|---|---|---|
| DE | 10203858 | A1 * | 8/2003 | E05C 1/04 |
| EP | 0927810 | A1 * | 7/1999 | E06B 9/80 |
| EP | 1921233 | A1 | 5/2008 | |
| ES | 2628040 | A1 * | 8/2017 | |
| KR | 200316060 | Y1 * | 12/2002 | E05B 47/0012 |
| WO | 2016130386 | A1 | 8/2016 | |

OTHER PUBLICATIONS

Annotated machine translation of Agirre ES 2628040 A1 (Year: 2017).*

Written Opinion of the International Searching Authority Intl. Application No. PCT/AU2019/050964; Mail date: Nov. 5, 2019; 5 Pages.

EPO; European Search Report and Written Opinion of the corresponding application 19857316.4; Dated May 3, 2022; pp. 1-4.

* cited by examiner

LOCK UNIT

CROSS REFERENCE TO RELATED APPLICATIONS

This application is a national phase entry of International Application No. PCT/AU2019/050964 filed Sep. 6, 2019 and claims the priority of foreign Application No. AU2018903350 filed Sep. 7, 2018. The disclosures of which are hereby incorporated herein in their entirety.

FIELD OF THE INVENTION

The present invention relates to a lock unit, having a drive unit and a lock assembly, for use in locking doors, particularly roller shutter doors typically used to close garage spaces. The invention can also be used for locking other closures, such as gates or panel members of different types.

BACKGROUND OF THE INVENTION

Roller shutter doors or sectional overhead doors are often formed from horizontal slats or panel elements hinged together. The door is raised to open it and lowered to close it. The door can be moved from an open position to a closed position manually, or by motorized means. In the closed position and when being moved to the closed position, lateral edges of the hinged panel elements are held in inwardly facing channel members. The panel elements are supported by roller members adapted to roll along inwardly facing C-shaped channel members forming a guide track for the rollers. Another form of door is a tilt door, which often consists of a single large panel connected to hinges and various springs at the top of the door on the left and right sides. The door is lifted to open it, and it tilts back and into the top of the building by swinging out and up.

When the door is moved into a closed position, it is typically lockable in this position by a key operated lock mechanism mounted in a position between the lateral edges of the door and between the upper and lower edges of the door. The lock mechanism generally moves a latching element outwardly of the door towards a surround location, such as towards the channel member described above. The latching element is retained in a latch-receiving portion, which may be in the form of a recessed portion or a striker plate. Alternatively, the lock mechanism may be located on a surrounding wall adjacent the guide track. In this configuration, the lock mechanism moves the latching element inwardly towards the door, wherein a striker plate positioned on the door receives the latching element.

Locking mechanisms such as those described above are generally assemblies made of entirely mechanical components that require manual actuation to move the latching element from an engaged position to a withdrawn position, or the assemblies may include electrical components such as motors and power supplies that allow for the motorised driving of the mechanical components of the lock assembly.

An example of an electromechanical lock configuration is provided in Australian Patent Application No. 2015238864. This document discloses a latchable restraining mechanism for restraining a closure means in a closed state. The mechanism includes a latch bolt assembly having a latch bolt movable between a withdrawn position and an extended active position. In the extended active position, the latch bolt engages in a position to restrain the closure means from moving from the closed position. The latch bolt assembly includes selectively operable electrically activated latch drive means drivingly connected via drive coupling means to said latch bolt to move the latch bolt from the extended active position to the withdrawn position. The drive coupling means is in the form of a rack and pinion configuration, whereby rotation of the pinion results in linear movement of the rack and thus linear movement of the latch bolt. If a user no longer wishes for the latch bolt assembly to be driven by the electrically activated latch drive means or if the electrically activated latch drive means fails, the latchable restraining mechanism can be manually overridden from an external position to enable the gear track to be moved and thus move the latch bolt from the extended active position to the withdrawn position.

Reference to any prior art in the specification is not an acknowledgement or suggestion that this prior art forms part of the common general knowledge in any jurisdiction or that this prior art could reasonably be expected to be combined with any other piece of prior art by a skilled person in the art.

SUMMARY OF THE INVENTION

In a first aspect, the present invention provides a lock unit, comprising: a lock assembly having a locking element and a drive receiving portion operatively associated with the locking element; and a drive unit connected to the lock assembly, the drive unit having a motor and being configured to move the locking element of the lock assembly from a locked position to an unlocked position, the drive unit including a driving element that interfaces with the drive receiving portion of the lock assembly to move the locking element from the locked position to the unlocked position, wherein the drive unit is separable from the lock assembly.

Advantageously, the present invention provides a lock unit with a drive unit that can be selectively engaged with and separated from the lock assembly. In other words, the present invention provides separation of the mechanical components of the lock assembly from the motor and electronic components associated with the drive unit. One benefit is that fitting of the lock assembly is made easier by reducing the bulkier space associated with an electromechanical lock unit that has an integral drive unit. The electronic components and motor are housed in the separable drive unit and not as part of the lock assembly, thereby providing a lock assembly that is more convenient for fitting to a given area. The ability to separate the drive unit from the lock assembly allows for surface mounting of the drive unit onto the lock assembly, which is fixed to the door or surrounding surface or door frame.

Accordingly, the drive unit being separable from the lock assembly makes it easier to access the fixing points or the various mechanical components of the lock assembly, as rather than having to remove an entire electromechanical lock unit from its fitted position before accessing the mechanical components within, the drive unit can be separated from the lock assembly, thereby exposing the mechanical components and or fixing points for easier access. The ready removability of the drive unit is also advantageous for the purposes of maintenance, battery change, or replacement of all or part of the drive unit, without disturbing the mechanical components of the lock assembly.

The drive unit being separable from the lock assembly also means that the lock assembly can remain in the locked position, even after removal of the drive unit from the lock assembly.

Another advantage that can arise from having the drive unit separable from the lock assembly is that the drive unit can be optimised to meet IP (international/ingress protection) ratings. The drive unit can also be easily adapted to doors of various sizes or other uses, such as for gates, etc.

In an embodiment, the drive unit provides an output substantially orthogonal in direction to that of a drive unit input provided by the motor (ie. the motor shaft output), and the lock assembly receives the drive unit output as a lock assembly input and provides a lock assembly output by moving the locking element in a direction substantially orthogonal to that of the received lock assembly input. This transmission of substantially orthogonal inputs and outputs allows the lock unit to be compact, but also allows for the simplified interaction and engagement of the drive unit and lock assembly. As will be understood, the drive unit output is provided by said drive unit driving element, while said lock assembly input is provided by said lock assembly drive receiving portion.

In an embodiment, the drive unit is configured for surface mounting to the lock assembly by engagement of a rear portion of the drive unit with a front portion of the lock assembly. This allows a user to directly attach the drive unit to, and separate the drive unit from, the lock assembly without the need of further installation complications. The respective portions preferably have mating complementary surfaces, each surface being at least partially planar.

In a preferred embodiment, the lock unit is substantially symmetrical. This enables its use in a right- or left-handed disposition relative to a movable closure to be secured by the lock unit.

In an embodiment, the drive unit is substantially symmetrical. In one form, the motor may be substantially centrally located within the drive unit, thereby allowing the driving element of the drive unit to interface with the drive receiving portion of the lock assembly, irrespective of the orientation of the lock assembly.

In other words, as the positioning of the motor in the drive unit also determines the location of an output shaft of the motor, positioning of the motor centrally within the drive unit means that irrespective of the positioning of the lock assembly and the direction in which the locking element is to be moved by the drive unit, the drive unit can accommodate for this by being oriented in such a manner so as to ensure that the driving element of the drive unit interfaces with the drive receiving portion of the lock assembly. Thus, the drive unit can be attached to a lock assembly irrespective of the positioning of the lock assembly relative to the door.

For example, the lock assembly may be mounted on a left side of the door, in a position between the lateral edges of the door and between the upper and lower edges of the door. In this position, the drive unit is attached to the lock assembly, with the locking element to be moved outwardly to the left of the door towards a surround location. A corresponding lock assembly may be located on the right of the door, in a position between the lateral edges of the door and between the upper and lower edges of the door, with the locking element to be moved outwardly to the right of the door towards a surround location. The drive unit can therefore be separated from the lock assembly on the left side of the door, and then attached to the lock assembly on the right side of the door, with the driving element of the drive unit now interfacing with the drive receiving portion of the lock assembly on the right side of the door.

Another advantage of the symmetrical configuration of the drive unit is that it simplifies fitting templates, is more adaptable to other uses (eg. gates) and is easier to manufacture a housing of the drive unit. Further, it is more aesthetically pleasing to a consumer having symmetrical drive units on either side of a door thereby providing a dual-lock configuration.

In an embodiment, the drive unit includes a drive train that limits back driving of the motor. Advantageously, this preserves the motor, which otherwise may be damaged in standard electromechanical lock units when being manually overridden. In an embodiment, the drive train is a worm drive.

In an embodiment, the drive unit includes a power supply, such as one or more batteries, operatively associated with the motor. An advantage of this embodiment is that the power supply can be changed or charged in a convenient location away from the lock assembly, with the door remaining locked. For example, if the power supply needs to be changed, the separable drive unit can be removed from the lock assembly, and the power supply removed and replaced. If the power supply is rechargeable, the power supply can be removed from the drive unit and charged away from the drive unit and lock assembly. Alternatively, the power supply may not to be intended for removal, such as an integral power supply. In such an embodiment, the drive unit may receive a cable, such as a USB cable or the like, to charge the power supply. In another embodiment, the drive unit may be docked in a charger unit in order to charge the power supply.

In one embodiment, the interface between the driving element and the drive receiving portion is a keyed interface. Preferably, the driving element is in the form of a male connecting element and the drive receiving portion is in the form of a female connecting element. The male and female connecting elements should have a single orientation of engagement, i.e. have no rotational symmetry so that the male and female connecting elements define the operational position of the drive unit and the lock assembly at a given time. The drive unit transfers the output from the motor to the male connecting element, which in turn drives, by the rotational coupling of the male and female connecting element, the locking element which is operatively associated with the female connecting element.

Another advantage derived by having the keyed interface is that the lock assembly can be manually overridden. This may be necessary in the event that the power supply and/or motor are not operating as intended. The drive unit can be separated from the lock assembly, thereby exposing the drive receiving portion. The drive receiving portion may receive a tool (eg. a key) that can cause movement of the locking element between the locked and unlocked positions. This is particularly beneficial as electromechanical lock units have often required back driving of the motor in order to manually override the electromechanical lock unit. Back driving of the motor is not desirable. Thus, it is advantageous to be able to manually override the lock assembly, but not to allow back driving of the motor.

In an embodiment, the lock assembly prevents back drive when the drive unit is not engaged. Advantageously, this embodiment of the invention provides a further means to prevent back driving of the lock unit, of particular benefit when the drive unit is removed. This can be achieved by way of any suitable mechanical arrangement, such as a one-way lever linkage (eg. a Geneva wheel mechanism), a ratchet, a self-locking gearing means an autoclutch, etc. Preferably, the lock assembly includes a locking cam mechanism. In a preferred form, the lock assembly operates by rotation of an intermediate element by action of the drive receiving portion causing translation of a carriage piece attached to or integral with said locking element, by virtue of the intermediate element engaging with the walls of a shaping (such as a recess) in the carriage piece. When the locking element is in its locked position, the intermediate element is seated against a part of said carriage piece shaping, such that force on the locking element (and hence on the carriage piece) in an attempt to move it towards the unlocked position results in jamming of said part of said carriage piece shaping against said intermediate portion. A locking cam arrangement of this sort provides a very simple, inexpensive and highly effective anti-backdrive mechanism.

In an embodiment, the lock assembly includes a manual thumb switch for moving the locking element between the locked position and the unlocked position when the drive unit is separated from the lock assembly. Advantageously, a user can manually cause the lock element to be moved between the locked and unlocked positions by simply actuating the thumb switch. In this embodiment, a key would not be needed to interact with the female connecting element. This ensures that if manual unlocking or locking is required quickly, the user can simply use the manual thumb switch on the lock assembly without needing to find a separate component.

In an embodiment, the drive unit includes a limit switch assembly for shutting off power to the motor when the locked or unlocked positions are reached. This provides a safety feature as the motor will be stopped from providing further torque when the desired locking position is reached.

In an embodiment, mounting points of the lock assembly are hidden by the drive unit when the drive unit is in operative engagement with the lock assembly. This provides a safety feature, as the positioning of the mounting points of the lock assembly are not apparent from looking at the arranged drive unit and lock assembly.

In an embodiment, the lock assembly includes a backbone style chassis. The chassis of the lock assembly can be such that it provides a complementary shape with the housing of the drive unit. The chassis thereby provides a functionally optimised structure that is also aesthetically integrated with the drive unit. In another embodiment, the chassis of the lock assembly may be a dual-mounting chassis. In other words, the chassis will allow a user to mount the chassis in two different ways. This can be beneficial in situations where there is limited space to position the lock assembly and the drive unit.

In a second aspect, the present invention provides a drive unit for a lock assembly, the drive unit having a motor and being configured to move a locking element of the lock assembly from a locked position to an unlocked position, the drive unit including a driving element that interfaces with a drive receiving portion of the lock assembly, the drive receiving portion being operatively associated with the locking element to move the locking element between the locked position and the unlocked position, wherein the drive unit is separable from the lock assembly.

By way of clarification and for avoidance of doubt, as used herein and except where the context requires otherwise, the term "comprise" and variations of the term, such as "comprising", "comprises" and "comprised", are not intended to exclude further additions, components, integers or steps.

Further aspects of the present invention and further embodiments of the aspects described in the preceding paragraphs will become apparent from the following description, given by way of example and with reference to the accompanying drawings.

DETAILED DESCRIPTION OF THE EMBODIMENTS

Figure 1:
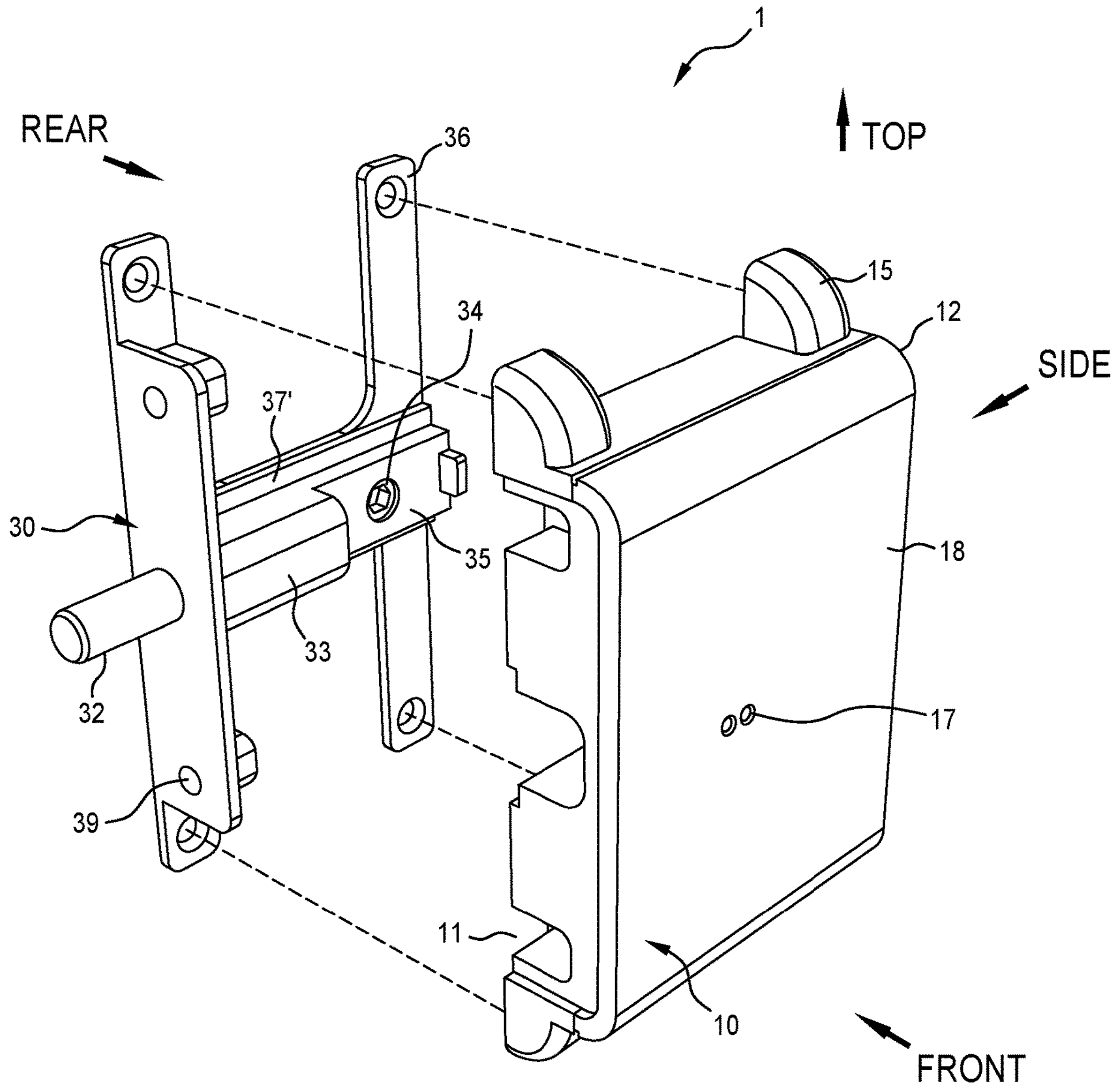
FIG. 1 is a front perspective view of a drive unit and a lock assembly in accordance with an embodiment of the invention.

With reference to FIG. 1, a drive unit 10 for a lock assembly 30 that together form a lock unit 1 is illustrated. For clarity, FIG. 1 shows which direction or view is being referred to when the terms front, side, top and rear are used in the specification with reference to the drive unit 10 or lock assembly 30.

The drive unit 10 is configured to drive a locking element, in the form of locking bolt 32, from an unlocked position to a locked position. As shown in FIG. 1, the drive unit 10 is separable from the lock assembly 30, thereby providing separation of the mechanical components of the lock assembly 30 from the motor and electronic components associated with the drive unit 10. The lock assembly 30 will be described in greater detail later.

Figure 2:
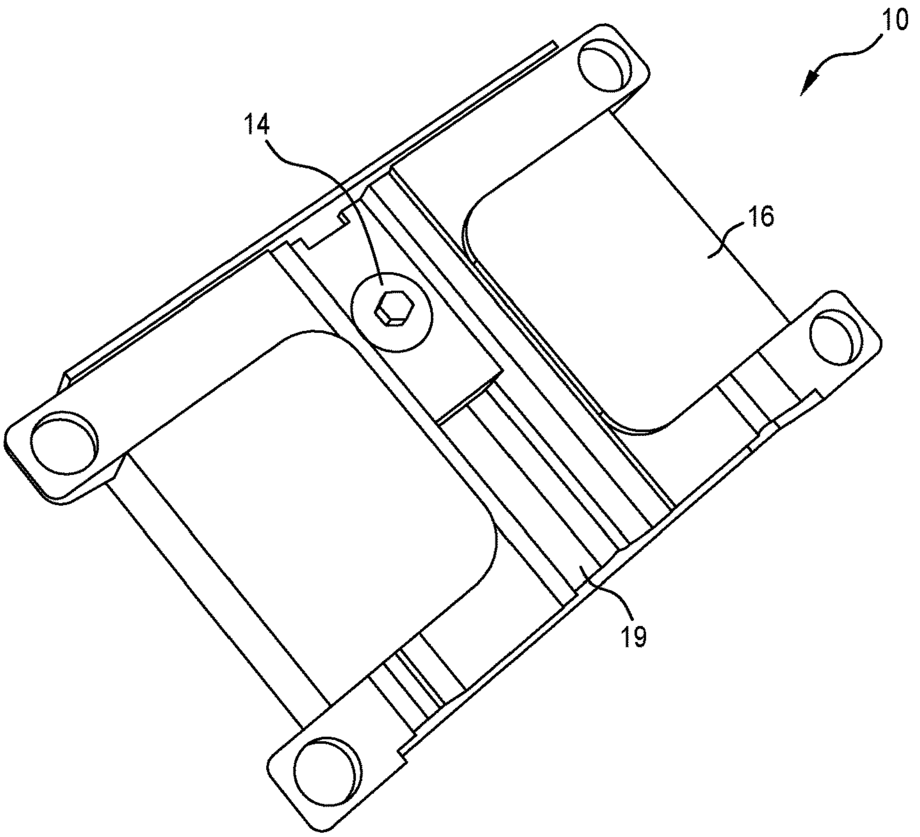
FIG. 2 is a perspective view taken from the rear of the drive unit of FIG. 1.

With reference to FIGS. 1 and 2, the drive unit 10 comprises a housing 12, which houses a motor 20 (FIG. 4) having an output shaft (not shown). The housing 12 comprises a rear cover 16 and a front cover 18. The front cover 18 and rear cover 16 are attached to one another in any suitable manner known in the art. For example, the front cover 18 and rear cover 16 may be connected via a hinge, suitable fasteners, a snap-fit connection, a threaded connection, etc.

The output shaft of the motor 20 is operatively associated with a driving element, in the form of a male connecting element 14, which protrudes outwardly from the rear cover 16 of the housing 12. The male connecting element 14 is configured to interface with a complementary drive receiving portion, in the form of female connecting element 34 of the lock assembly 30. The male connecting element 14 and the female connecting element 34 together form a keyed interface for driving the locking bolt 32. Whilst preferably the driving element is the male component of the keyed interface and the drive receiving portion is the female element of the keyed interface, a person skilled in the art will appreciate that the position of the male and female connecting elements could be mutually interchangeable between the lock assembly 30 and the drive unit 10.

The male connecting element 14 has a hexagonal cross-section, as would be associated with a typical hex key. The female connecting element 34 has a complementary hexagonal socket that receives the male connecting element in operative engagement therewith. The male connecting element 14 need not have a hexagonal cross-section, but may instead be round (with a spline or key), oblong, triangular, half-moon shaped, or any other suitable shape. Similarly, the female connecting element 34 can be a socket of any shape that provides a complementary cross-section to the male connecting element 14 in order to receive the driving torque provided by the male connecting element 14.

The rear cover 16 includes a recess 19 adjacent to male connecting element 14. The recess 19 is sized to accommodate locking bolt housing 33, which houses locking bolt 32, when the drive unit 10 is attached to lock assembly 30. Thus, positioning of the recess 19 is based on the positioning of the locking bolt housing 33, whilst the position of the male connecting element 14 is based on the positioning of the motor 20 in the drive unit 10. The recess 19 and male connecting element 14 are aligned along an axis parallel to a planar extent of the housing 12 as shown in FIG. 2. Whilst the alignment of the recess 19 and the male connecting part 14 is suitable for lock assembly 30 due to the nature of the lock assembly of this embodiment, in an embodiment that adopts a different lock assembly, the recess 19 and the male connecting element 14 may not be so aligned. The drive unit 10 can be tailored for any standard lock assembly to which it is to be attached.

Figure 3:
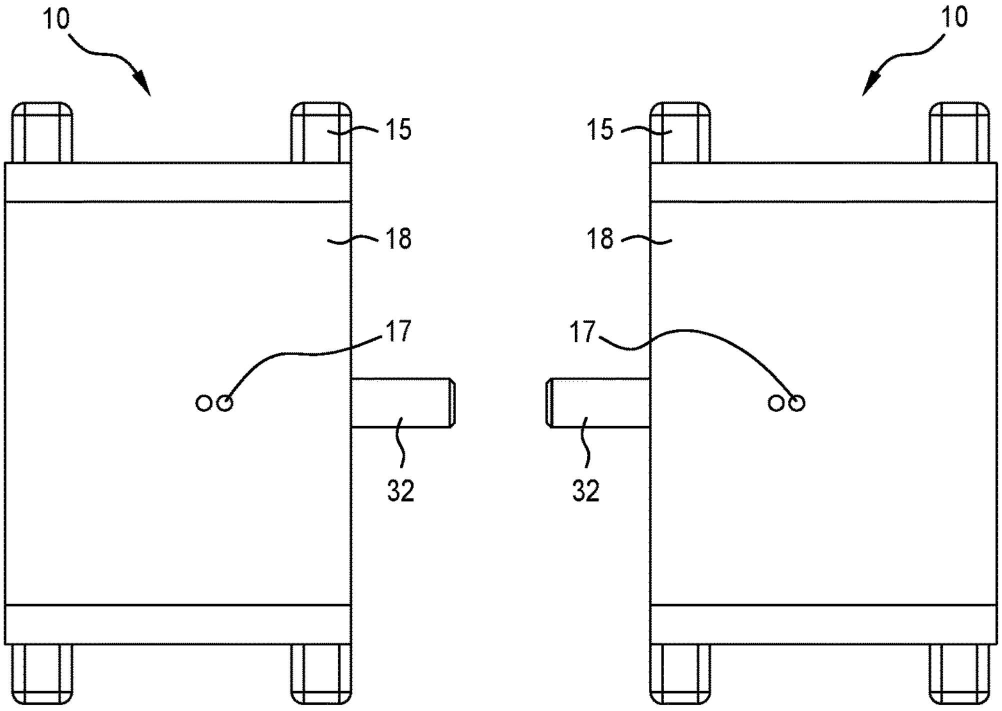
FIG. 3 is a front view of a pair of drive units attached to respective lock assemblies in accordance with an embodiment of the invention showing the symmetry of this embodiment.

In some situations, the recess 19 and the male connecting element 14 are aligned along an axis central of the drive unit 10, i.e. the alignment occurring along a central spine or an axis equidistantly spaced between two ends of the drive unit 10. This provides the drive unit 10 with a level of symmetry, thereby allowing the drive unit 10 to be connected to locking assemblies such as lock assembly 30, irrespective of the orientation of the lock assembly. This difference in orientation may arise depending on where the lock assembly is positioned on or relative to a door, such as which side of the door the lock assembly is on or closest to. This means that drive unit 10 can be easily attached to a suitable lock assembly regardless of the positioning of the lock assembly relative to the door (for example, the lock assembly being positioned on or at the left or right side of the door). An example of the symmetry of the drive unit is shown in FIG. 3, which depicts drive unit 10 attached to a lock assembly that has a locking bolt 32 projecting to the right in the locked position (left figure) and drive unit 10 attached to a lock assembly that has a locking bolt 32 projecting to the left in the locked position (right figure). When fitted on or at either side of a door, the symmetrical nature of the drive units shown in FIG. 3 provide a dual-lock configuration. In other words, the symmetrical form means that the drive unit 10 and the lock assembly 30 are both suitable for left or right handed installation, with no aesthetic or functional difference between the two.

The symmetrical form of the drive unit 10 also has the benefit of simplifying fitting templates. This makes manufacturing of standardised drive units and lock assemblies simpler because the drive unit can easily be oriented to suit the configuration and/or positioning of a given lock assembly on a door or surrounding surface.

As would be appreciated by a person skilled in the art, the drive unit 10 can be surface mounted to a suitable lock assembly. This eliminates complications that may arise from other electromechanical locking arrangements and demonstrates the advantageous separable nature of the drive unit from an existing lock assembly and the ease of access to the drive unit 10 or lock assembly 130 for a user.

Housing 12 also includes shaped portions defining bolt covers 15 which project outwardly and along an axis parallel with a planar extent of front cover 18. Four bolt covers 15 are shown in the depicted embodiment of the drive unit 10. The bolt covers 15 provide a means to conceal mounting bolts associated with the lock assembly 30. This provides protection to the mounting bolts and presents a more aesthetic finish to the overall lock unit, and prevents access to the mounting bolts when drive unit 10 is in place. The housing 12 further includes one or more LEDs 17 visible from the front cover 18. The LEDs can provide an indication of an operational status of the drive unit 10 (eg. on or off), or an indication relating to power supply of the device (to be discussed later).

Figure 4:
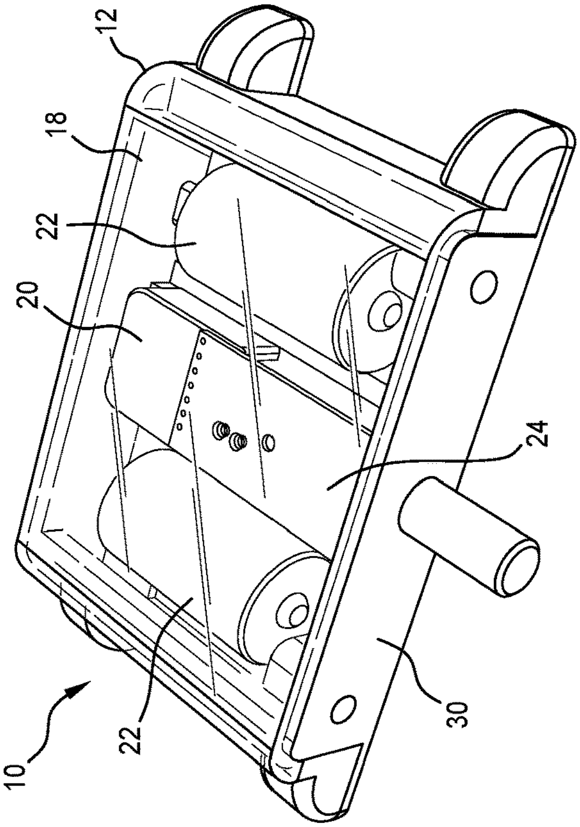
FIG. 4 is a perspective view from the top of the drive unit of FIG. 1 (attached to the lock assembly) with the top cover shown in transparency revealing some of the electronic components within the drive unit.

Reference is now made to FIG. 4, which depicts front cover 18 of housing 12 in transparency, to show the internal components of drive unit 10. The location of the various components is discussed below, but some of the design considerations of the depicted embodiment include minimising the overall footprint of the drive unit 10, particularly when adapting the drive unit to a suitable lock assembly, and providing improved functionality.

The drive unit 10 includes motor 20 which drives the male connecting part 14. As can be seen in this figure, the motor 20 is located in a central position of the housing 12 which allows the drive unit to be symmetrical and hence allows the drive unit 10 to be attached to a suitable lock assembly irrespective of the lock assembly's orientation relative to the door. The central positioning of motor 20 also allows the motor to be self-locating, meaning that when the drive unit 10 is disassembled (for maintenance or charging purposes), the motor 20 can be easily positioned within the housing 12 upon reassembly of the drive unit 10 without requiring a level of great skill. In part, the self-locating nature of the motor 20 is also brought about by the manner in which the motor 20 is intended to drive rotation of the male connecting element 14. The motor 20 utilises a gearing arrangement in the form of a worm drive (not shown). This gearing arrangement drives rotation of the male connecting element 14 about an axis perpendicular to the front cover 18 of the drive unit 10. A particular advantage of this gearing arrangement is that unlike ordinary gear trains, the direction of transmission of the worm drive is not reversible, helping to prevent back-driving of the motor. However, the invention is not to be limited to this driving arrangement, as it is within the scope of the invention for alternative driving or gearing arrangements to be used. For example, a screw drive motor could be used.

A circuit board 24 is mounted within housing 12 and towards the front cover 18. As is the case with the other electronic components, the circuit board 24 is positioned in a convenient location so that it can be easily accessed upon removal of the front cover 18 of housing 12. The positioning of the circuit board 24 also allows incorporated LEDs 17 to be visible from the front cover 18 of housing 12. The motor 20 and circuit board 24 are suitably shrouded in order to improve the water and/or dust resistance of the drive unit 10.

A power supply may be provided within housing 12 of the drive unit 10. In the depicted embodiment, two C batteries 22 are located on either side of the motor 20 within drive unit 10, suitably electrically connected to motor 20 and circuit board 24. The batteries 22 provide the motor 20 with the necessary power to operate. The batteries 22 thus also power other electronic components within the drive unit 10 (LEDs 17, circuit board 24). A person skilled in the art will appreciate that any suitable power source can be used. In the depicted embodiment, the positioning of batteries 22 on either side of motor 20 is also beneficial as they are easily accessible when the front cover 18 of housing 12 is removed and their positioning is consistent with the symmetry of the drive unit 10. It will be appreciated that the power supply may instead or in addition be external to the drive unit 10 with, for example, the drive unit 10 receiving a cable from an external power supply at female plug 26 (FIG. 5) in order to power electronic components within the drive unit 10. This may be required in circumstances where the power requirements are higher than that which can be supplied by the battery.

Figure 5:
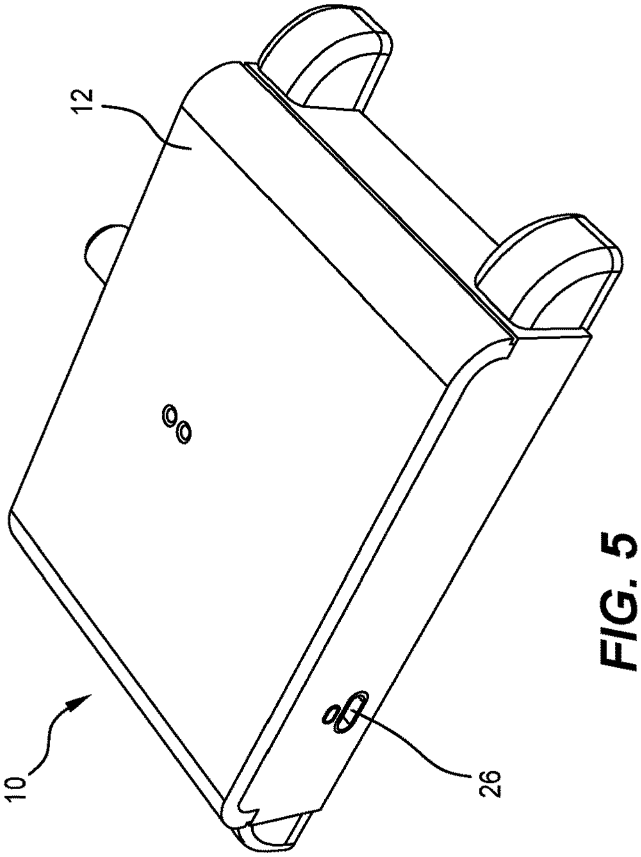
FIG. 5 is a perspective view from the front of the drive unit of FIG. 1 showing the drive unit attached to the lock assembly.

The power supply may be rechargeable by, for example, a USB-C charging cable. Referring to FIG. 5, female plug 26 may act as a USB-C charging port 26 for receiving a suitable adaptor to charge rechargeable batteries 22 within the drive unit 10. The power supply (or the entire drive unit 10) may instead be charged by being docked at a suitable charging station. A rechargeable power supply means that over time there are no or fewer occasions when the power supply needs changing. The separable aspect of the drive unit is particularly highlighted in a scenario where the drive unit 10 is attached to a lock assembly (such as lock assembly 30), and the power supply is low or flat. The drive unit 10 can be simply separated from the lock assembly, without the locking bolt 32 being withdrawn (i.e. the door remains locked), and the drive unit 10 moved to a suitable location for charging.

Suitable communication electronics coupled to an antenna (not shown) may also be contained within housing 12 of the drive unit 10. The communication electronics may be integrated into circuit board 24. The communication electronics are configured to receive signals from an external source, such as a wireless remote control (a base station, a smartphone or the like) and send signals. The signals can be used to trigger one or more of powering on the drive unit, powering off the drive unit, moving the locking bolt from a locked to an unlocked position, moving the locking bolt from an unlocked to a locked position, and receiving status information relating to one or more of the electronic components in the drive unit.

Figure 6:
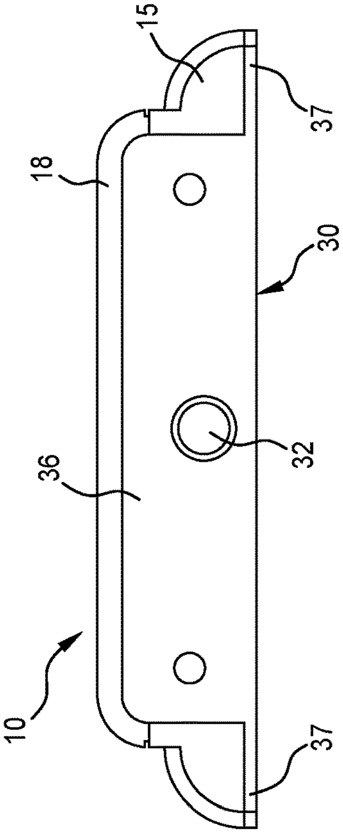
FIG. 6 is a side view of the drive unit of FIG. 1 (attached to the lock assembly)
Figure 7:
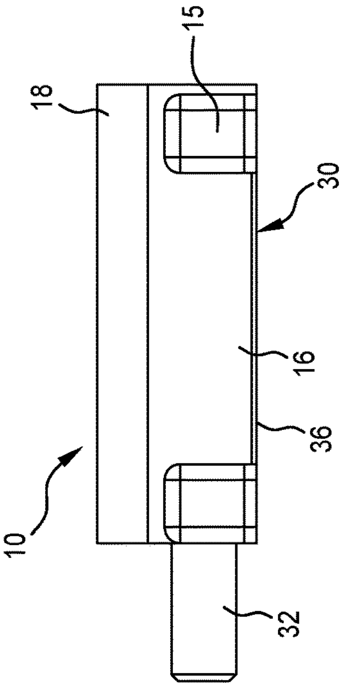
FIG. 7 is a top view of the drive unit of FIG. 6.

FIGS. 6 and 7 show the drive unit 10 attached to lock assembly 30. The lock assembly 30 includes a chassis 36, which will be described in greater detail later. As well as supporting the lock actuation assembly 35, chassis 36 is designed to provide mounting points for the lock assembly 30 that allow the lock unit 1 to be low profile, i.e. minimise the distance the drive unit 10 protrudes beyond a mounting surface (eg. a wall or door). This makes the lock unit 1 relatively less bulky than some known electromechanical lock units. Further, as explained below, chassis 36 (which supports the components of lock assembly 30) is mountable to the mounting surface, meaning that there is no need for an additional mounting bracket, as generally required by prior art lock units. The various curved surfaces of the front cover 18, the bolt covers 15, and the rear cover 16 provide an aesthetically pleasing but functional presentation of the drive unit 10. FIG. 7 shows the locking bolt 32 extending from the lock assembly 30, thereby signifying that the lock is in a locked position. When the locking bolt is in the withdrawn, i.e. unlocked position, the locking bolt 32 is housed within locking bolt housing 33 which is covered by the drive unit 10. The locking bolt 32 can be of any suitable length and diameter.

The lock assembly 30 will now be described with reference to FIG. 8. The lock assembly 30 includes the chassis 36. The chassis 36 is a backbone-style chassis. Reference to a backbone-style chassis in this context is a reference to a frame-like structure, which supports various components of the lock assembly 30, which has been strengthened in regions expected to bear greatest load, i.e. at lock actuation assembly 35 and mounting points 31, and have excess material removed in regions that bear little to no load. This ensures that chassis 36 is lightweight and that the costs of producing the chassis are reduced. As shown, the chassis comprises a generally H-shaped mounting bracket, with two parallel and spaced apart legs 37, connected by a bridging portion 37' (FIG. 1) extending between the legs 37. Extending inwardly, i.e. towards the attachment position of the drive unit 10, and perpendicular to the leg 37, adjacent locking bolt housing 33, is a chassis bracket 38. Chassis bracket 38 includes apertures 39 for mounting the chassis bracket 38 of the chassis 36.

Chassis 36 can be mounted either by utilising the mounting points 31 on legs 37, or mounted by utilising apertures 39 of chassis bracket 38. For example, when mounting the lock assembly 30 directly to the door, or an adjacent side wall having sufficient space, it is preferable to mount using mounting points 31 of legs 37. However, if the lock assembly is not mounted to the door, and the adjacent side wall has insufficient space, i.e. a low side room case, it may be preferable to mount the lock assembly 30 in the side rail adjacent the door. In this situation, a user may mount lock assembly 30 by utilising apertures 39 of chassis bracket 38. Overall, the lock assembly 30 of this embodiment provides flexibility in terms of its mounting, whilst still being able to receive the drive unit 10 as required. A pair of integrally formed projections 41 extend inwardly i.e. towards the attachment position of the drive unit 10, between the chassis bracket 38 and the adjacent leg 37. The projections 41 provide a degree of additional strength against bending between the chassis bracket 38 and adjacent leg 37, but more importantly act as locating features that fit within corresponding pockets 11 on the rear cover 16 of the drive unit 10.

Fixed onto the bridging portion 37' is lock actuation assembly 35. Lock actuation assembly 35 comprises the locking bolt 32, the locking bolt housing 33, the female connecting element 34, and the locking mechanism (not shown). The locking mechanism is preferably a locking cam mechanism such as that disclosed in U.S. Pat. No. 5,551,264. One benefit of utilising a locking cam mechanism in the lock assembly herein described is that the locking bolt 32 cannot be pushed back into the locking bolt housing 33 by an external force, providing a safety feature against unauthorised unlocking of the device, and preventing back-driving of the motor. In addition, a locking cam mechanism can also potentially use fewer parts, provide a less complex assembly, be easier to service, and be more suited to an external/outdoor application, as compared to a conventional rack and pinion configuration such as the mechanism disclosed in Australian Patent Application No. 2015238864.

Figure 8:
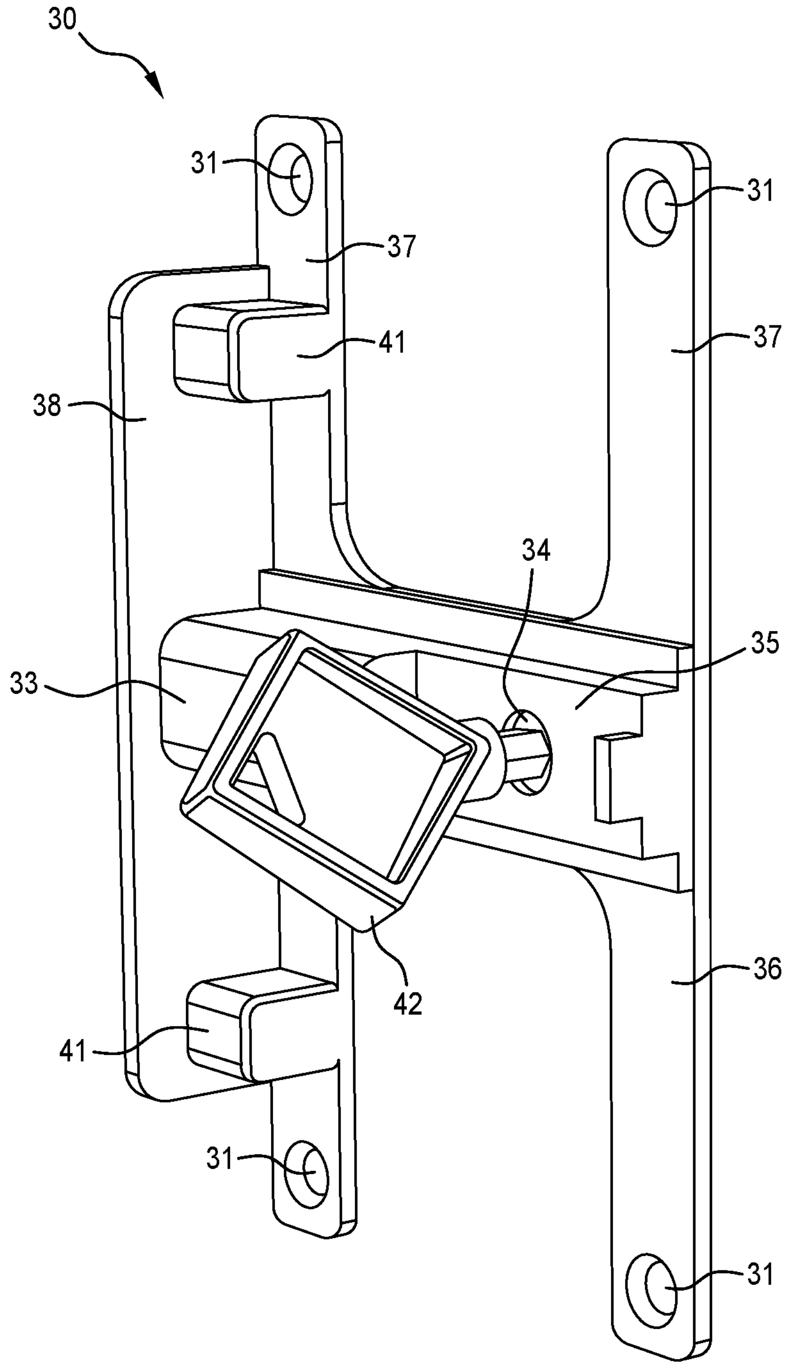
FIG. 8 is a perspective view of the lock assembly in accordance with an embodiment of the invention with a key engaged with the lock assembly.

Reference is now made to FIG. 8, which depicts the manner in which operation of the lock assembly 30 may be manually realised when drive unit 10 is detached from the lock assembly 30. This detachment exposes the female connecting element 34. A suitable key 42 (i.e. having a shank and suitably shaped external form) may be used to manually engage the lock actuation assembly 35 and rotated to move the locking bolt 32 from a locked position to an unlocked position. This is particularly useful when the drive unit 10 is inoperable due to a flat power supply, a motor failure, or the like. Rather than the complications and effort required to open up a conventional electromechanical lock and actuate the manual override, the drive unit 10 can be simply detached from the lock assembly 30 and the key 42 used to operate the locking bolt 32.

To install the drive unit 10 and lock assembly 30 of the present invention, first the lock assembly 30 is appropriately mounted by bolts to a door or surrounding surface at the mounting points 31 or apertures 39. The drive unit 10 is then attached to the lock assembly 30. To facilitate the connection between the drive unit 10 and the lock assembly 30, complementary connecting elements are located on both the drive unit 10 and the lock assembly 30. For example, one of the drive unit 10 or lock assembly 30 may include tabs (not shown) that mate or latch within complementary receiving portions (not shown) on the other one of the drive unit 10 or lock assembly 30.

In operation, the motor 20 drives the male connecting element 14. Rotation of the male connecting element 14 rotates female connecting element 34, which causes lock actuation assembly 35 to move the locking bolt 32 from a locked position to an unlocked position (or vice versa). The drive unit 10 can then be separated from the lock assembly 30, leaving the lock assembly in the state in which it was last placed in. Preferably, the complementary connecting elements are located on either side of the lock unit to allow for easy one handed attachment and detachment of the drive unit 10 from the lock assembly 30. This highlights the benefit of having a separable drive unit 10 that allows a user to power the lock assembly 30 through simple surface mounting of the drive unit 10 onto the lock assembly 30.

Figure 9:
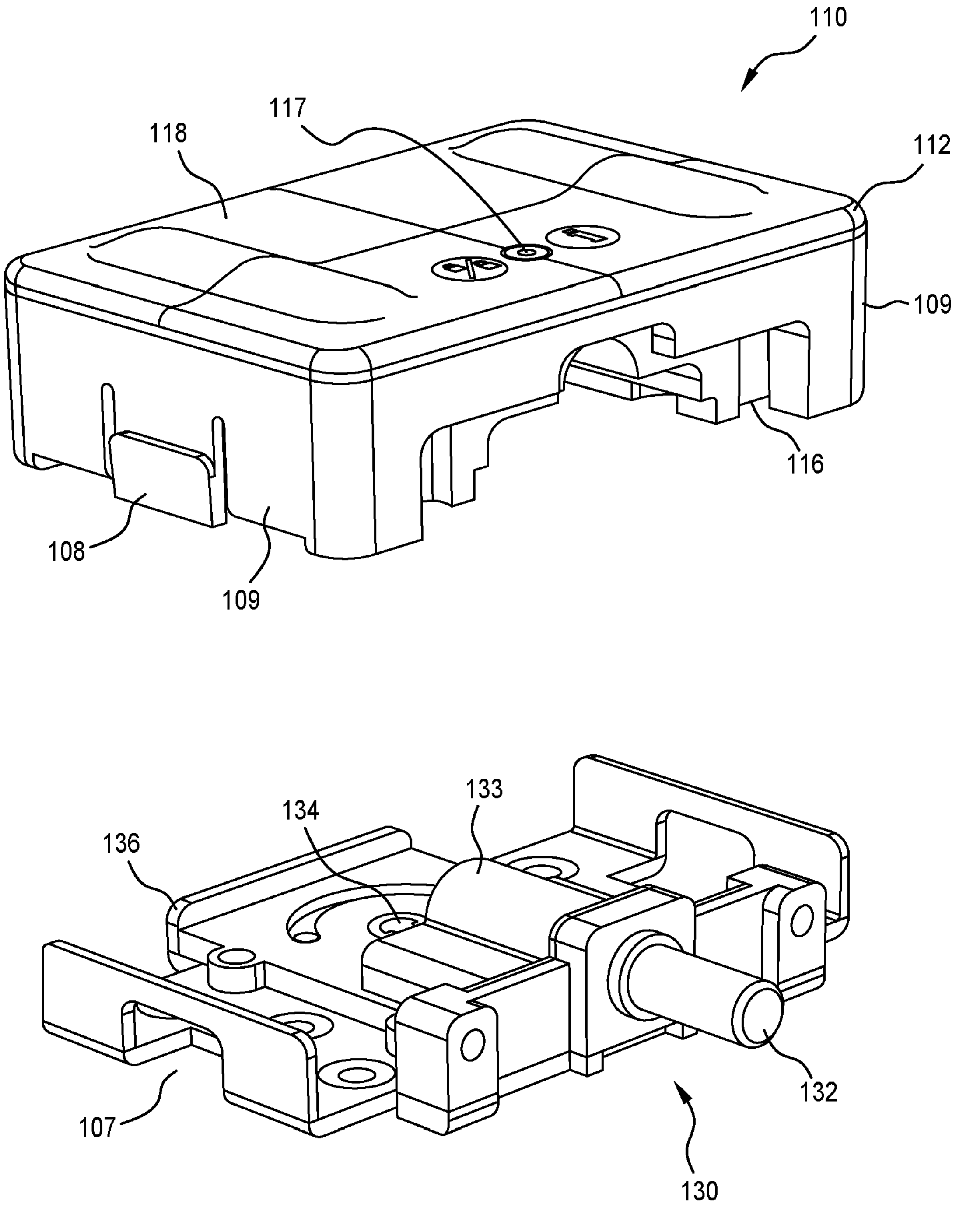
FIG. 9 is a side perspective view of a drive unit and a lock assembly in accordance with another embodiment of the invention, with the drive unit and lock assembly separated from each other.
Figure 10:
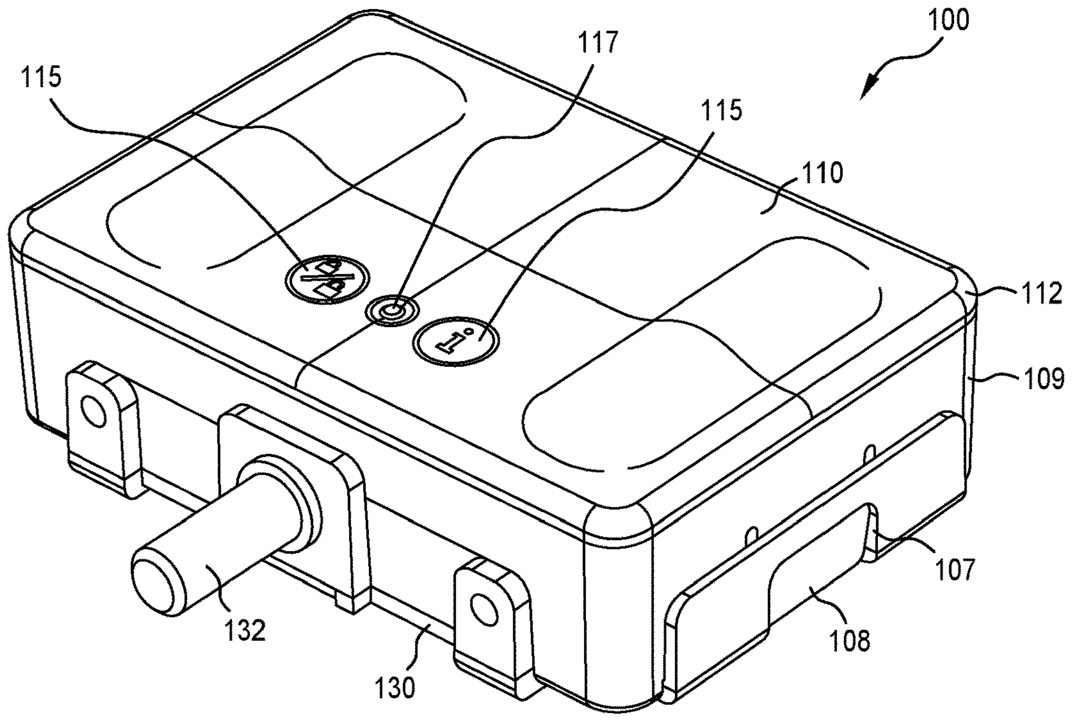
FIG. 10 is a side perspective view of FIG. 9 with the drive unit and the lock assembly assembled together.

Reference is now made to FIGS. 9 and 10, which illustrate another embodiment of the lock unit of the present invention. The lock unit 100 includes drive unit 110 and lock assembly 130. References to orientation of this embodiment (e.g. front, rear, side, etc) have the same meaning as discussed in the previous embodiment. Most of the advantages and features described in reference to the previous embodiment equally apply in the present embodiment unless otherwise stated.

The drive unit 110 is configured to drive a locking element, in the form of locking bolt 132, from an unlocked position to a locked position (and vice versa). As shown in FIG. 9, the drive unit 110 is separable from the lock assembly 130, thereby providing separation of the mechanical components of the lock assembly 130 from the motor and electronic components associated with the drive unit 110. The lock assembly 130 will be described in further detail later.

The drive unit 110 comprises a housing 112, which houses a motor 120 (FIG. 12) having an output shaft (not shown). The housing 112 comprises a rear cover 116 and a front cover 118. The front cover 118 and rear cover 116 are attached to one another in any suitable manner known in the art as described above. As is the case with the previous embodiment, the housing 112 is designed so as the drive unit 110 can assume a low profile, i.e. consume minimal space outwardly from the lock assembly 130. In this embodiment, the batteries 122 protrude slightly beyond the rear cover 116, and the top cover 118 is shaped to accommodate the batteries 122, whilst maintaining as low a profile as possible.

Figure 11:
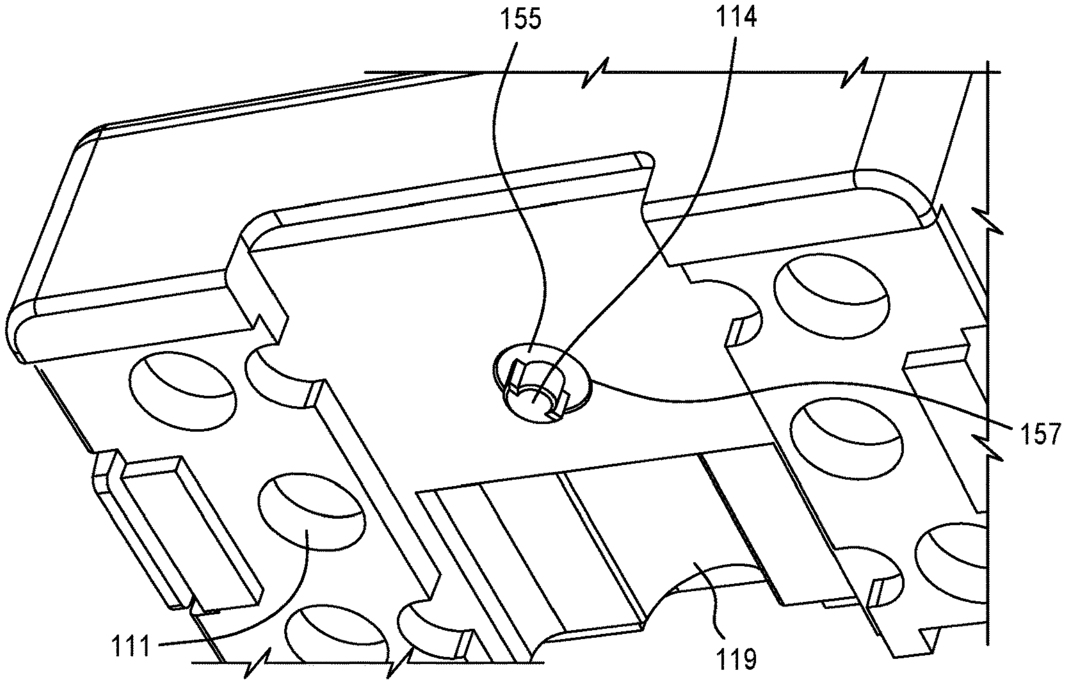
FIG. 11 is a partial rear perspective view of the drive unit of FIG. 9.

By way of a gear arrangement described below, the output shaft of the motor 120 is operatively associated with a driving element, in the form of a male connecting element 114, which protrudes orthogonally from the rear cover 116 of the housing 112 (FIG. 11). The male connecting element 114 is configured to interface with a complementary drive receiving portion, in the form of female connecting element 134 of the lock assembly 130 (see FIG. 14). The male connecting element 114 and the female connecting element 134 together form a keyed interface for driving the locking bolt 132. A person skilled in the art will appreciate that the position of the male and female connecting elements could be mutually interchangeable between the lock assembly 130 and the drive unit 110.

The male connecting element 114 has a cross section in the form of two semi-circles of different radii with congruent chord. The female connecting element 134 has a complementary shaped socket that receives the male connecting element 114 in operative engagement therewith. The male connecting element 114 may instead be of any other suitable shape or cross-section that provides a single orientation engagement. In other words, the shape of the male connecting element 114 should have no rotational symmetry between itself and the female connecting element 134. Similarly, the female connecting element 134 can be a socket of any shape that provides a complementary cross-section to the male connecting element 114 in order to receive the driving torque provided by the male connecting element 114 and function as described above. The cross sections of the male connecting element 114 and female connecting element 134 are shaped in this way to ensure that the drive unit 110 and the lock assembly 130 can only be mated in one orientation so that the absolute position of the locking bolt 132 is known. This means that depending on the orientation of the male connecting element 114 at any given time, the female connecting element 134 is at a corresponding point, i.e. locked, unlocked, partly unlocked, when the drive unit 110 and the lock assembly 130 are mated together.

Referring to FIG. 11, the rear cover 116 includes a recess 119 adjacent to male connecting element 114. The recess 119 is sized to accommodate locking bolt housing 133, which houses locking bolt 132, when the drive unit 110 is attached to lock assembly 130. Thus, positioning of the recess 119 is based on the positioning of the locking bolt housing 133, whilst the position of the male connecting part 114 is based on the positioning of the motor 120 in the drive unit 110. The recess 119 and male connecting element 114 are aligned along an axis parallel to a planar extent of the housing 112 as shown in FIG. 11. Whilst the alignment of the recess 119 and the male connecting part 114 is suitable for lock assembly 130 due to the nature of the lock assembly of this embodiment, in an embodiment that adopts a different lock assembly, the recess 19 and the male connecting element 14 may not be so aligned. Ultimately, like the previous embodiment, the outer surface of the rear cover 116 is designed to accommodate the lock assembly 130. The rear cover 116 also includes pockets 111, which are configured to accommodate the heads of the bolts that fasten the chassis 136 of lock element 130 to a surface (eg. a door or a wall adjacent the door).

As in the previous embodiment, the symmetrical construction of the drive unit 110 allows the drive unit 110 to be connected to locking assemblies such as lock assembly 130, irrespective of the orientation of the lock assembly. This difference in orientation may arise depending on where the lock assembly is positioned on or relative to a door, such as which side of the door the lock assembly is on or closest to. This means that drive unit 110 can be easily attached to a suitable lock assembly regardless of the positioning of the lock assembly relative to the door (for example, the lock assembly positioned on the left or right side of the door). As is clear from the figures of this embodiment (for example, FIG. 10), the symmetry of the drive unit 110 means it can be attached to the lock assembly 130 that has a locking bolt 132 which projects to the right or the left in the locked position. As described above, the symmetrical form means that the drive unit 110 and the lock assembly 130 are both configured for left or right handed installation, with no aesthetic or functional difference between the two.

As would be appreciated by a person skilled in the art, the drive unit 110 can be surface mounted to a suitable lock assembly 130. This again eliminates complications that may arise from other electromechanical locking arrangements and demonstrates the advantageous separable nature of the drive unit 110 from an existing lock assembly 130. The drive unit 110 includes tabs 108 that project outwardly and upwardly from a lower portion of opposing side walls 109. Tabs 108 are received by chassis 136 at slots 107. When in engagement, tabs 108 are secured within slot 107 as shown in FIG. 10. The level of engagement between tab 108 and slot 107 needs to be suitable to retain drive unit 110 in operative engagement with lock assembly 130 and to provide sealing engagement to minimise ingress of dust and dirt. One example is the use of a snap-fit engagement. To separate the drive unit 110 from lock assembly 130, a user simply presses inwardly the tabs 108 so as the tabs 108 disengage from slot 107. The user can then simply pull away the drive unit 110 from lock assembly 130. Attachment of the drive unit 110 to the lock assembly 130 involves the opposite process, whereby the user presses in the tabs, preferably a single tab first, then moves the drive unit 110 towards lock assembly 130 (with the male and female connecting parts aligned in orientation). Once one of the opposing walls 109 and its corresponding tab is adjacent the slot, the user releases the force on the tab and the tab resiliently moves into its secured position within slot 107. The user then moves the other side of drive unit 110 so that the tab on the opposing side is moved towards its corresponding slot 107. Once in position, the user releases the force on the tab and the tab resiliently moves into its secured position within slot 107. Thus, the attachment and separation of drive unit 110 to and from lock assembly 130 is achieved by a simple one-handed operation. Whilst only a single engagement mechanism has been described between the drive unit 110 and lock assembly 130, a person skilled in the art will appreciate that any suitable engagement mechanism can be utilised that allows the user to attach and separate the drive unit and lock assembly by simple one or two-handed operation.

The housing 112 includes one or more LEDs 17 and one or more buttons 115, both visible from the front cover 118. A single LED 117 may be used that can illuminate a different colour depending on the information it is providing. For example, a red light indicates that the lock unit 100 is in a locked position, and a green light indicates that the lock unit 100 is in an unlocked position. The one or more buttons 115 are actuated by depressing a flexible portion of the front cover 118 as shown in FIG. 9 so that the buttons 115 remain sealed within housing 112. The buttons 115 include a button to lock or unlock the lock unit 100, and a button which queries an operational status of the drive unit 10, such as the state of the electrical components contained within the housing 112. For example, when the status button is pressed, the status of the batteries 122 are indicated to a user by the LED 117. A red light is used to indicate that the battery power is low, and a green light is used indicate that the battery power is above a given threshold. A further press of the status button queries a further status mode, with different coloured lights or flashing patterns of LED 117 indicating to the user a particular detail of that status mode.

Figure 12:
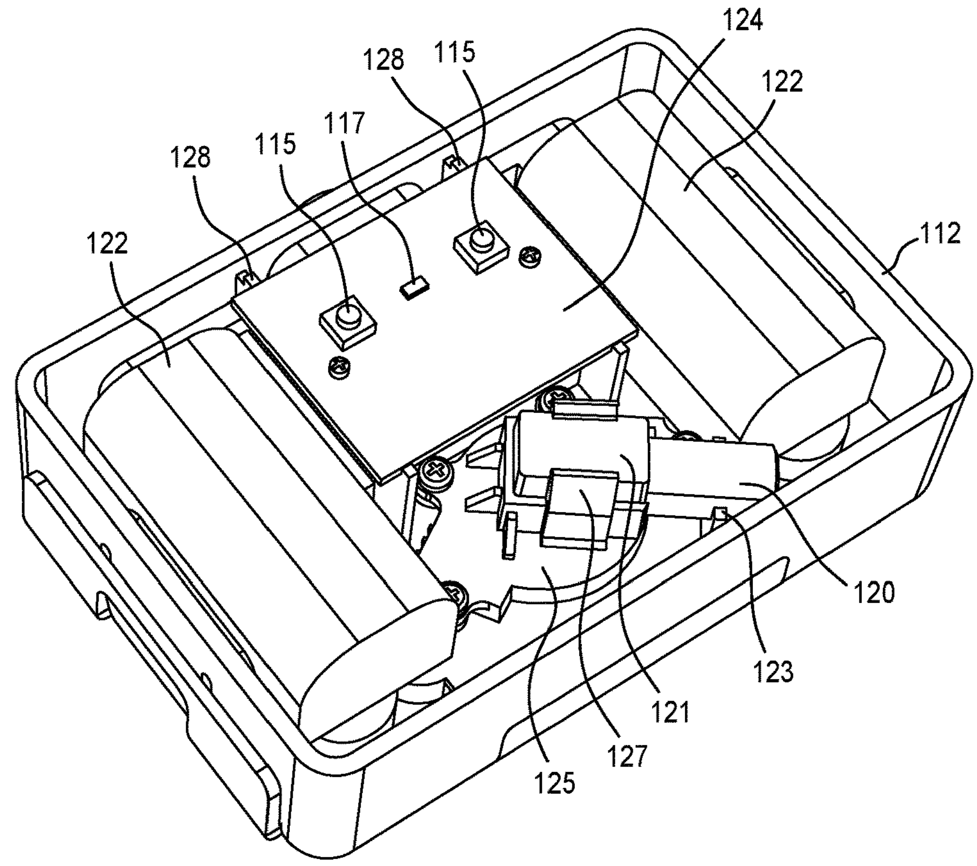
FIG. 12 is a top perspective view of the drive unit of FIG. 9, with a top cover of the drive unit removed.

Reference is now made to FIG. 12, which provides the drive unit 110 with the front cover 118 of housing 112 removed so as to see some of the components within drive unit 110. The drive unit 110 includes motor 120 which drives the male connecting part 114. The motor 120 is positioned on locator 123, which provides the correct positioning of the motor 120 within housing 112. The output shaft of motor 120 (not shown) is connected to a gear arrangement within gear box 121, which in this embodiment is a 90° worm drive. This gearing arrangement drives rotation of the male connecting element 114 about an axis perpendicular to the front cover 118 of the drive unit 110. As mentioned previously, a particular advantage of this gearing arrangement is that the direction of transmission of the worm drive is not reversible, preventing back-driving of the motor. Gear box 121 is securely positioned to limit switch assembly cover 125. In the depicted embodiment, a pair of holding tabs 127 extend upwardly from a top surface of limit switch assembly cover 125, with a distal end of the holding tabs 127 inclined or curved inwardly towards each other. The holding tabs 127 provide a simple snap-fit clipping feature that, with locator 123, helps hold the gear box 121 and motor 120 in position within the housing 112. The limit switch assembly cover 125 is fastened to an inner surface of housing 112. The limit switch assembly cover 125 provides a seal against ingress of dust and dirt to the limit switch assembly 150. The limit switch assembly 150 will be described in greater detail later.

A circuit board 124 is mounted within housing 112 (and is adjacent the front cover 118 when assembled) on a pair of mounting walls 128, which extend towards the top cover 118 from an inner surface of housing 112. As is the case with the other components, the circuit board 124 is positioned in a convenient location so that it can be easily accessed upon removal of the front cover 118 of housing 112. The positioning of the circuit board 124 also allows incorporated LEDs 117 and buttons 115 to be visible through the front cover 118 of housing 112.

On either side of the circuit board 124 is positioned a battery 122 suitably electrically connected to motor 120 and circuit board 124. The batteries 122 provide the motor 120 with the necessary power to operate and also power the electronic components within the drive unit 110 (LEDs 117, circuit board 124). In the depicted embodiment, the positioning of batteries 122 on either side of circuit board 124 is also beneficial as they are easily accessible when the front cover 118 of housing 112 is removed and their positioning is consistent with the symmetrical construction of the drive unit 110. The batteries 122 may be housed within a battery casing so as to provide physical separation between the batteries 122 and other electronic components within housing 112. This may be particularly advantageous in regulating the internal temperature of drive unit 110.

Figure 13:
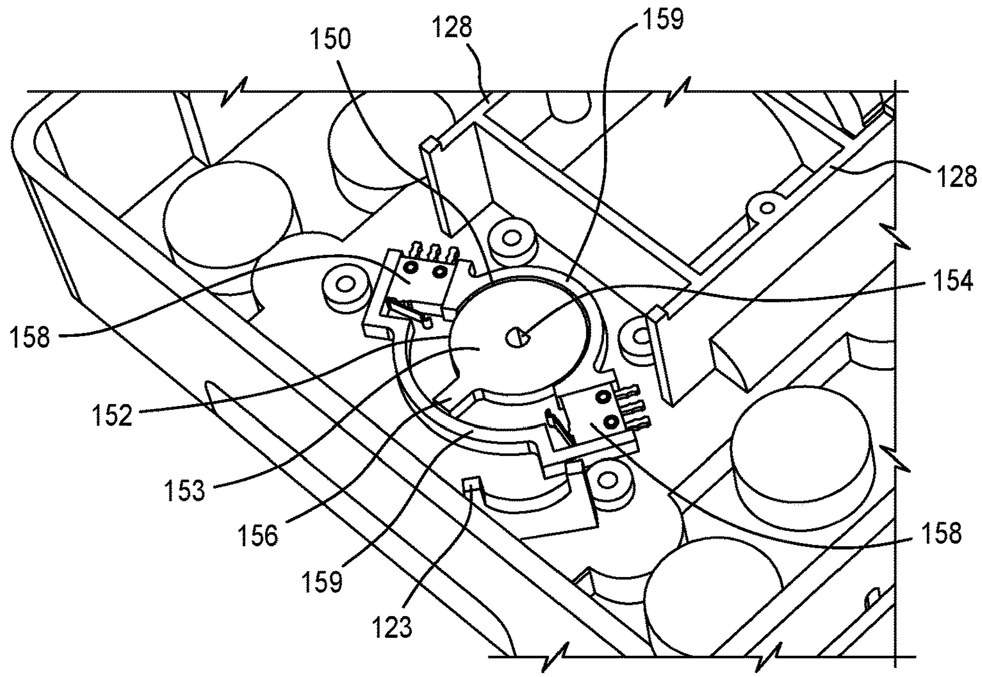
FIG. 13 is a partial perspective view of a limit switch assembly of the drive unit of FIG. 12.

In FIG. 13, the limit switch assembly cover 125 has been removed to expose some of the components of the limit switch assembly 150. The purpose of the limit switch assembly 150 is essential in relation to the operating of the motor 120, i.e. to shut off the motor when the locked or unlocked positions are reached. The limit switch assembly 150 includes an actuator 152. The actuator 152 is substantially circular in shape, although any suitable shape for the actuator may be used. The actuator 152 includes a top face 153 that faces towards the top cover 118 when the top cover 118 is attached to the rear cover 116. The actuator 152 also includes a rear face 155 (FIG. 11), parallel and spaced away from top face 153. The rear face 155 faces towards the rear cover 116 of housing 112. As will be appreciated from FIGS. 11 and 13, the male connecting element 114 extends orthogonally from rear face 155 and out of an opening 157 in rear cover 116. The actuator 152 also includes a semicircular shaped aperture 154, which extends between the top face 153 and rear face 155. The aperture 154 is configured to receive a suitably shaped shaft (not shown) from gear box 121. The actuator 152 also includes a key portion 156 extending radially from a side surface of the actuator 152. The key portion 156 is adapted to engage contacts 158 of limit switch assembly 150. When engaged, the contacts 158 are configured to shut off the motor 120. The contacts are engaged by key portion 156 when the lock assembly 130 reaches a locked position and when the lock assembly 130 reaches an unlocked position. The actuator 152 and contacts 158 are kept in appropriate spaced relation by raised walls 159, which act to both hold and locate the actuator 152 and contacts 158. The raised walls 159 form a path that locates the elements of the limit switch assembly 150 and provide a path for key portion 156 when actuator 152 is rotated.

In operation, the motor 120 provides a torque via the output shaft to gear box 121. In turn, gear box 121 provides a torque via the shaft that is engaged in aperture 154 and carries male connecting element 114. This torque causes actuator 152 to rotate in a direction depending on whether it is moving lock assembly 130 from a locked to unlocked position or unlocked to locked position until key portion 156 engages contact 158. Once engaged, contact 158 causes motor 120 to shut off, thereby indicating the completion of a transition from one state to the other.

Figure 14:
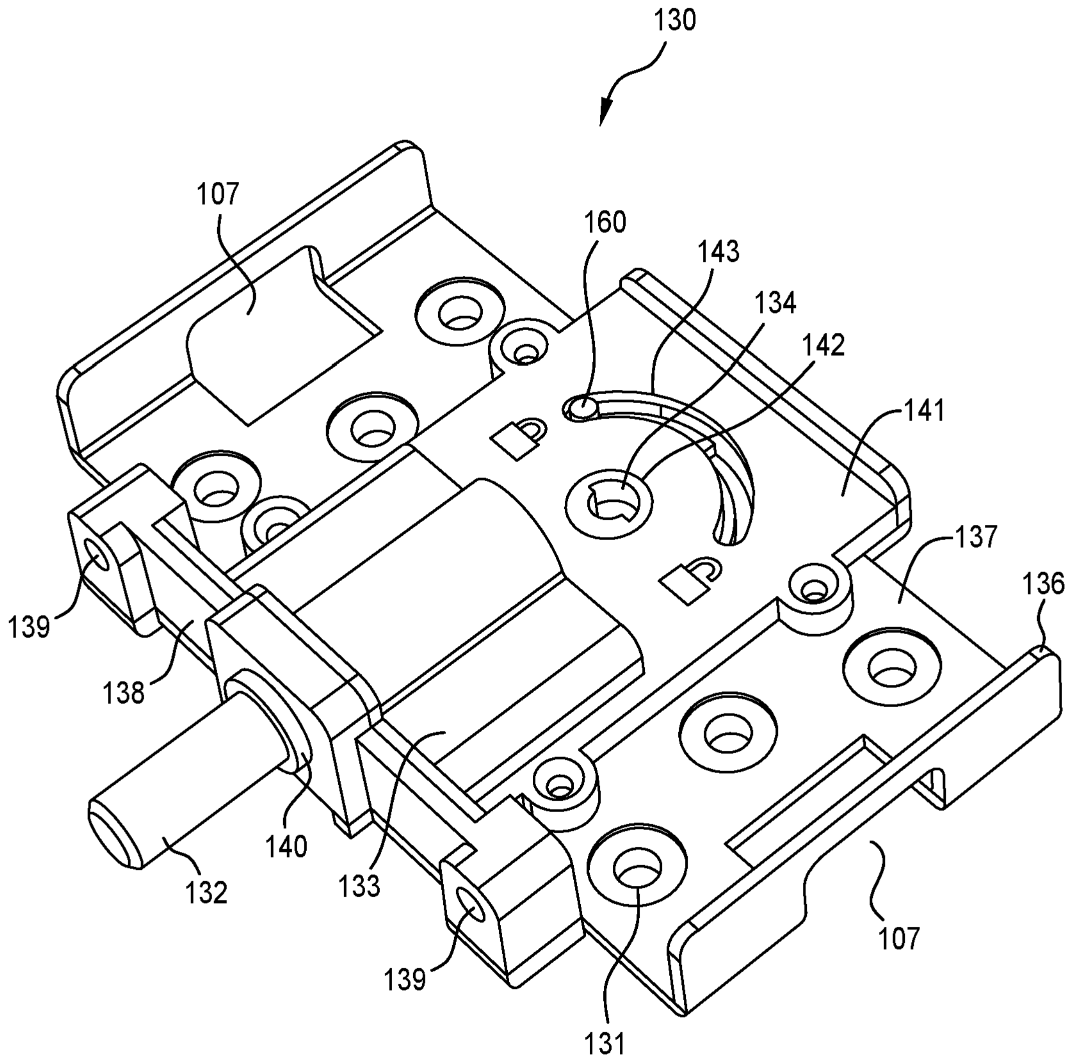
FIG. 14 is a top perspective view of the lock assembly of FIG. 9.

Reference is now made to FIG. 14, which illustrates lock assembly 130. The lock assembly 130 includes chassis 136, which will be described in greater detail later. As well as supporting the lock actuation assembly 135 (FIGS. 15 and 16), chassis 136 is designed to provide mounting points 131 for the lock assembly that are a low profile so as to accommodate attachment of the drive unit 110 and minimise the distance the drive unit 110 protrudes beyond a mounting surface (eg. a wall or door). FIG. 14 shows the locking bolt 132 extending from the lock assembly 130, thereby signifying that the lock is in a locked position. When the locking bolt is in the withdrawn, i.e. unlocked position, the locking bolt 132 is housed within locking bolt housing 133 which is covered by the drive unit 110. The locking bolt 132 can be of any suitable length and diameter. Preferably, locking bolt 132 is a rounded bolt as a rounded bolt has been found to have advantages that will be described later.

The chassis 136 is generally in the form of a plate-like structure, i.e. a structure with minimal material removed, thereby supporting various components of the lock assembly 130. As shown in this embodiment, the chassis 136 comprises a chassis base 137 and chassis bracket 138. The chassis base 137 is a structure elongated in a direction transverse to the locking bolt 132, having slots 107 at both ends. These ends of the chassis base 137 are substantially L-shaped making the cross section of chassis base 137 when viewed from the side substantially C-shaped. The chassis base 137 includes the plurality of mounting points 131, each configured to receive a bolt in order to mount the chassis base 137 of lock assembly 130. The positioning of the mounting apertures 131 correspond to the positioning of the pockets 111, so as the bolt heads are received in the pockets. This covering of the mounting bolts is advantageous for aesthetic and security reasons. Chassis bracket 138 extends inwardly, i.e. towards the attachment position of the drive unit 110, and perpendicular to the chassis base 137. Chassis bracket 138 includes apertures 139 for mounting the chassis bracket 138 of the chassis 136. As in the first embodiment, chassis 136 can be mounted either by utilising the mounting points 131 on chassis base 137, or mounted by utilising apertures 139 of chassis bracket 138 depending on the installation situation. The chassis bracket 138 is shaped to fit within corresponding spaces in the rear cover 116 of the drive unit 110.

Chassis bracket 138 also includes a collar 140 that extends circumferentially around locking bolt 132. Collar 140 acts as a locating feature for installation of the chassis 136 when chassis bracket 138 is used. For example, when mounting the chassis 136 via the chassis bracket 138 of this embodiment, three holes must be drilled, i.e. two holes for the bolts that go through apertures 139, and a hole for the locking bolt 132. However, when installing the chassis 136, the locking bolt 132 will be retracted into locking bolt housing 133. If the hole intended for the locking bolt is misaligned relative to the apertures 139, when the locking bolt 132 extends out of the locking bolt housing 133, it will foul against a surface of the wall. The presence of the collar means that firstly, a larger hole needs to be drilled that fits the collar, and secondly, receipt of the collar in the hole provides the installer a positive indication that the hole for the locking bolt 132 is correctly aligned relative to the apertures 139 and that the locking bolt 132 will not foul when it extends out from locking bolt housing 133.

As shown in FIG. 14, there is also provided a lock actuation assembly cover 141, which covers and holds the components of the lock actuation assembly 135. The lock actuation assembly cover 141 may be integrally formed with locking bolt housing 133, or be a separate component. The lock actuation assembly cover 141 is fastened to chassis base 137 via a plurality of countersunk bolts, however other fasteners may be used. The lock actuation assembly cover 141 includes an opening 142 configured to receive the female connecting element 134. Lock actuation assembly cover 141 also includes an arcuate slot 143, which acts as a track for a manual thumb slider switch 160, which will be described in detail later. Adjacent either end of the slot 143 are symbols indicating to a user the locked or unlocked position of the lock assembly 130.

Figure 15:
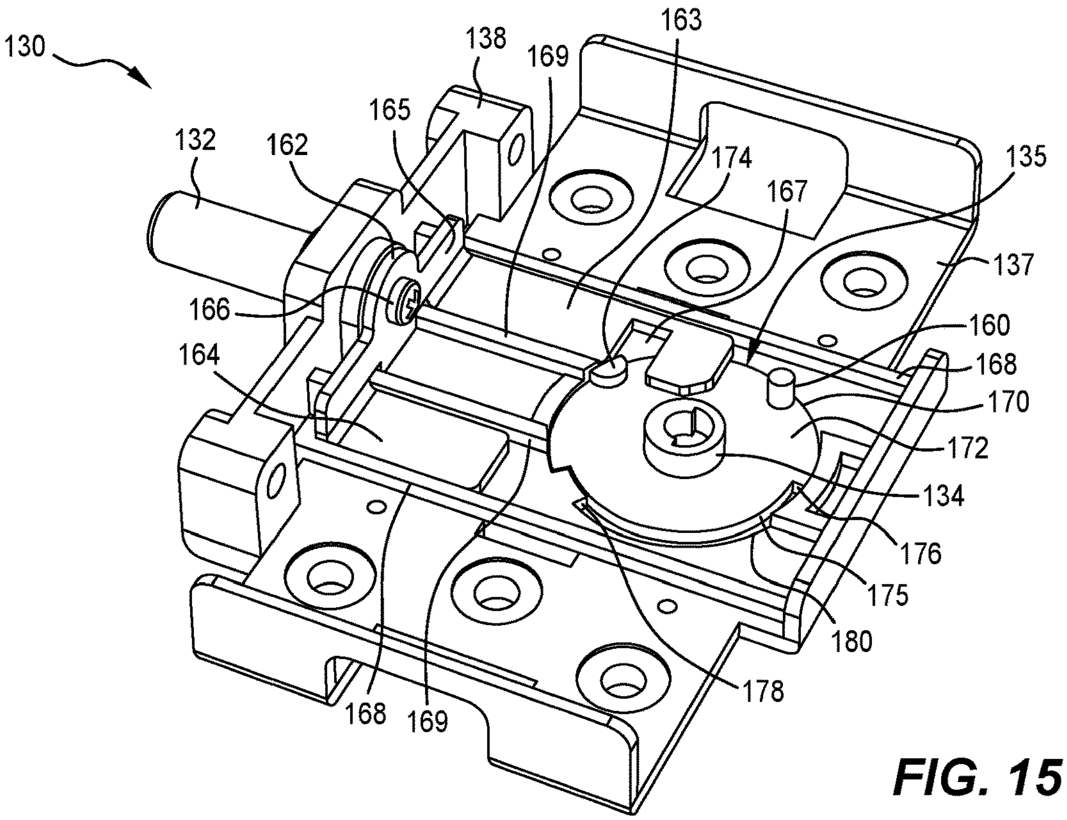
FIG. 15 is a top perspective view of the lock assembly of FIG. 9 in the locked position, with the lock actuation mechanism cover removed.
Figure 16:
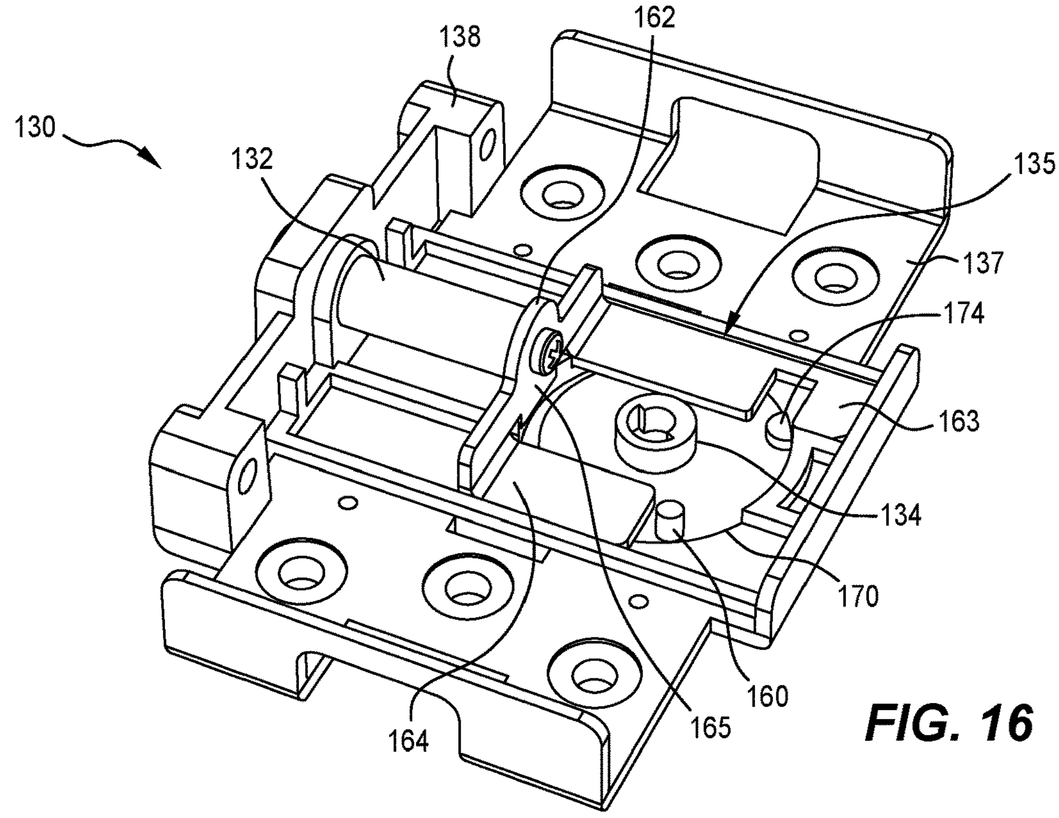
FIG. 16 is a top perspective view of the lock assembly of FIG. 9 in the unlocked position, with the lock actuation mechanism cover removed.

Reference is now made to FIGS. 15 and 16, which show the lock actuation assembly 135 with the lock actuation assembly cover 141 removed. The lock actuation assembly 135 includes a carriage 162, which comprises a carriage bracket 165 and two parallel extending legs 163, 164. In this embodiment, the first leg 163 is longer than the second leg 164 and includes a cut-out 167 at a distal end (i.e. away from locking bolt 132). The carriage is connected to a proximal end of locking bolt 132 by a screw 166. The locking bolt 132 being rounded is preferable as it was found to have advantages when screw mounted to the carriage 162. This was because when applying torque to tighten the screw, the locking bolt 132 would not bind against the chassis 136 (unlike when using a bolt with a square profile, for example). The carriage 162 is configured to move with locking bolt 132 along a longitudinal axis of locking bolt 132. The carriage 162 moves along a path defined by parallel raised outer walls 168 on chassis base 137, whilst locking bolt 132 moves along a path defined by parallel raised inner walls 169 on chassis base 137.

Lock actuation assembly 135 further includes rotating disc 170 having an upper surface 172, from which female connecting element 134 projects orthogonally therefrom, a lower surface that is seated or retained in a recess 180 on chassis base 137, and an outer peripheral edge 175. Also extending from upper surface 172 is a shaped boss 174 as shown, configured to engage with cut-out 167 of the first leg 163 as described below, and a manual thumb slider switch 160. Manual thumb slider switch 160 allows a user to manually lock and unlock the lock assembly 130 when the drive unit 110 is detached. In this embodiment, the manual thumb switch plays the same role as key 42 of the previous embodiment. Manual thumb slider switch 160 is also useful during installation to check or set alignment between the male connection element 114 and female connecting element 134. Rotating disc 170 is not entirely circular. Instead, rotating disc 170 includes abutment surfaces 176 formed by a portion of the outer peripheral edge 175 being recessed radially inwardly from the larger outer diameter of disc 170. Abutment surfaces 176 are configured to abut corresponding abutment walls 178 formed in chassis base 137.

The process of moving the locking bolt 132 from a locked position to an unlocked position with the drive unit 110 will now be described. With the drive unit 110 engaged to the lock assembly 130 (with the male connecting element 114 operatively engaged with female connecting element 134), the output shaft of motor 120 provides a torque to gear box 121, which is transferred to actuator 152. Rotation of actuator 152 corresponds to rotation of male connecting element 114, and thus rotation of the rotating disc 170 (which receives the torque via the female connecting element 134). Rotation of the rotating disc 170 will lead to boss 174 engaging leg 163 by engagement with the side walls of cut-out 167, boss 174 thereby driving carriage 162 to translate along the path defined by walls 168 (and the locking bolt 132 to translate along the path defined by walls 169) until abutment surface 176 meets and is stopped by abutment wall 178. This defines the unlocked position as shown in FIG. 16. Movement of the locking bolt 132 from the unlocked to locked position is achieved by the reverse action. As will be understood, shaped boss 174 acts as a cam, making sliding contact with parts of carriage 162 to impart reciprocal motion thereto.

It will be appreciated that lock actuation assembly 135 is configured to prevent back driving, whether drive unit 110 is engaged with lock assembly 130 or not. This is accomplished by using a locking cam mechanism, involving the particular relative configuration of shaped boss 174 and first leg 163 of carriage 162. With rotational movement of disc 170, boss 174 is arranged to engage the side walls of cut-out 167 and thus drive movement of carriage 162 (and hence locking bolt 132), the reverse is not necessarily the case. As will be understood, at the two extreme positions of carriage 162 (see FIGS. 15 and 16), any attempt to move carriage 162 (eg. by urging locking bolt 132) will result in the corners of cut-out 167 simply jamming against the shaped outer surface of boss 174, without resulting in any rotation of disc 170. In other words, at these two positions, the force imparted by carriage 162 against boss 174 will result in a resultant force on disc 170 in the radial direction, with no component of force in the circumferential direction. This adds to safety, as bolt 132 cannot simply be urged by an external force into an unlocked position. As the skilled reader will understand, alternative anti-backdrive mechanisms can be employed with lock actuation assembly 135.

The manner in which operation of the lock assembly 130 is manually realised if, for example, the drive unit 110 is separated from the lock assembly 130 (because the drive unit 110 may be inoperable at a given time) involves movement of manual thumb slider switch 160. After the drive unit 110 is detached from the lock assembly 130 (as shown in FIG. 14), a user can use their thumb to move manual thumb slider switch 160 along slot 143. This causes rotating disc 170 to rotate as would otherwise be caused by the drive unit 110 when in operative engagement with lock assembly 130. This will cause movement of the various components of lock assembly 130 as described above and thereby move the locking bolt 132 from a locked position to an unlocked position or a locked position to an unlocked position. This means of manually locking and unlocking is particularly beneficial as it does not require the user to have a key, which in an emergency situation can save time.

Any suitable materials can be utilised for producing the lock units herein described. Certain components are preferably made of a metal, whilst others are preferably made of a suitable polymer or plastic. For example, the chassis may be a die cast zinc, the carriage may be made of steel, and the locking bolt may be a polished steel, chrome plated brass rod. The drive unit covers may be made of ABS, whilst components such as the male connecting element, and lock actuation assembly cover may be made of Delrin®. A person skilled in the art will appreciate the various considerations involved in material selection, such as the loads the component is expected to undergo and the overall weight of the lock unit.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A two-part lock unit for locking an overhead garage door and for mounting at a suitable position on or adjacent the overhead garage door, the two-part lock unit comprising:

a first part of the two-part lock unit being a lock assembly having a locking element and a drive receiving portion operatively associated with the locking element, the first part coupled to a surface of the overhead garage door or an adjacent wall or rail; and a removable second part of the two-part lock unit being a drive unit configured to be connected to the lock assembly, wherein the drive unit is physically separable from the lock assembly, the drive unit having a motor and being configured to move the locking element of the lock assembly from a locked position, in which movement of the overhead garage door is impeded, to an unlocked position, in which movement of the overhead garage door is allowed, the drive unit including a driving element that interfaces with the drive receiving portion of the lock assembly to move the locking element from the locked position to the unlocked position when the first and second parts are connected together, said interface between the driving element and the drive receiving portion being a keyed interface having only a single relative orientation of engagement so that the driving element and the drive receiving portion define an operational position of the drive unit and the lock assembly at a given time;

wherein the first part of the two-part lock unit being the lock assembly includes an anti-backdrive mechanism configured such that when the drive unit is physically separated from the lock assembly, the locking element cannot be forcibly moved from the locked position to the unlocked position by an external force applied on the locking element in a direction which would otherwise drive it toward the unlocked position.

2. The two-part lock unit of claim 1, wherein the drive unit includes a first connecting element arranged substantially orthogonal in direction to an output of the motor, said output configured to drive said first connecting element and thereby provide a drive unit output to the lock assembly, and the lock assembly includes a second connecting element configured to receive the drive unit output as a lock assembly input and provide a lock assembly output by moving the locking element in a direction substantially orthogonal to that of the received lock assembly input to the second connecting element.

3. The two-part lock unit of claim 2, wherein the first connecting element is the driving element, and the second connecting element is the drive receiving portion.

4. The lock two-part unit of claim 1, wherein the drive unit is configured to be surface mounted to the lock assembly by engagement of a rear portion of the drive unit with a front portion of the lock assembly.

5. The two-part lock unit of claim 1, wherein the lock unit is substantially symmetrical, thereby enabling use of the lock unit in a right- or left-handed disposition relative to the overhead garage door.

6. The two-part lock unit of claim 1, wherein the drive unit includes a gear box that limits back driving of the motor.

7. The two-part lock unit of claim 6, wherein the gear box comprises a worm drive.

8. The two-part lock unit of claim 1, wherein the lock assembly is configured to be selectively manually operable, once the drive unit has been physically separated therefrom, in order to move the locking element between the unlocked and locked positions.

9. The two-part lock unit of claim 8, wherein the lock assembly is configured to be engaged by a tool engageable with the drive receiving portion of the lock assembly, which effects movement of the locking element between the unlocked and locked positions.

10. The two-part lock unit of claim 8, wherein the lock assembly includes a manual actuator for selectively moving the locking element between the locked position and the unlocked position.

11. The two-part lock unit of claim 1, wherein the drive unit includes a limit switch assembly for shutting off power to the motor when the locked or unlocked positions are reached.

12. The two-part lock unit of claim 1, wherein mounting points of the lock assembly are hidden by the drive unit when the drive unit is in operative engagement with the lock assembly.

13. A drive unit for a two-part lock unit for locking an overhead garage door and for mounting at a suitable position on or adjacent the overhead garage door, the drive unit for use with a first part of the two-part lock unit being a lock assembly, the drive unit providing a removable second part of the two-part lock unit, the drive unit comprising:

a motor and being configured to move a locking element of the lock assembly from a locked position, in which movement of the overhead garage door is impeded, to an unlocked position, in which movement of the overhead garage door is allowed;

a driving element that interfaces with a drive receiving portion of the lock assembly, said interface between the driving element and the drive receiving portion being a keyed interface having only a single relative orientation of engagement so that the driving element and the drive receiving portion define an operational position of the drive unit and the lock assembly at a given time; and a gear box that limits back driving of the motor:

wherein the drive receiving portion is operatively associated with the locking element to move the locking element from the locked position to the unlocked position;

wherein the drive unit is physically separable from the lock assembly such that the drive unit is removeable from the lock assembly while in the locked position to ensure the overhead garage door is impeded from movement.

* * * * *